March 5, 1963 P. M. CUNNINGHAM 3,080,532

VOLTAGE VARIABLE GAIN CIRCUIT WITH GATE CORRECTION

Filed Jan. 14, 1960

INVENTOR.
PAUL M. CUNNINGHAM
BY [signature]
ATTORNEY
[signature]
AGENT 3,080,532
Patented Mar. 5, 1963

3,080,532

VOLTAGE VARIABLE GAIN CIRCUIT WITH GATE CORRECTION

Paul M. Cunningham, Dallas, Tex., assignor to Collins Radio Company, Cedar Rapids, Iowa, a corporation of Iowa Filed Jan. 14, 1960, Ser. No. 2,474
4 Claims. (Cl. 330—130)

This invention relates generally to amplifier gain control and more specifically to an amplifier arrangement wherein the gain may be controlled as a function of a variable control or gate voltage in accordance with a particular, desired gain function.

Ofttimes it becomes desirable to control the gain of an amplifier as some discrete function of a control voltage as, for example, in the gain control of a video amplifier for incorporation with a radar display in which the gain of the video signal applied to the radar indicator tube may require a control function related to the deflection or sweep voltage for the electron beam.

The present invention finds particular useage, for example, in a video amplifier arrangement for the application of video signal to a direct view storage tube. Direct view or "bright" storage tubes are known in the art and need not be described in detail herein. Tube of this type produce an image of high contrast and brightness with controllable persistence. Direct view storage tubes are a cathode ray tube application with a viewing screen that is illuminated in proportion to the charge imparted on a storage mesh. The charged image on the mesh is produced by a scanning, video-modulated, electron beam from a writing gun to which the video information is presented. In operation, the writing gun of a direct view storage tube makes certain areas of the storage mesh positive while a flood gun within the tube makes the remaining area negative. The resultant luminescent image on the viewing screen is therefore brightest in the area corresponding to the most positive areas of the storage mesh. Graduations of potential on the storage mesh result in the desired half-tone gradations on the viewing screen. While only instantaneous illumination is possible with a conventional cathode ray tube when used with a PPI presentation, the persistence of the image on the storage tube is greatly extended and the rate of fading or persistence of the displayed image may be readily controlled by controlling the application of erase pulses.

Direct view storage tubes inherently require compensation for the convergence of sweep lines when used for a PPI display so as to produce a uniform image on the phosphorescent screen throughout the entire viewing range. The storage characteristics of the direct view tube vary with writing current, writing speed, the angle of incident of the writing beam with the storage mesh, and the relative sizes of writing beam cross section and storage mesh particles. The written image tends to be more intense where the scan lines converge near the center of the screen because of the higher effective integrated storage effects in this area due to overlap of several sweep traces. Because of this inherent characteristic of the direct view tube, it becomes necessary, in order to arrive at a uniform PPI type of display, to correct in some manner the application of video signal and to relate the intensity of the application of the video signal as a function of distance. The present invention, therefore, provides a voltage variable gain circuit which is controlled by the application of a direct-current control or gate voltage. The control or gate voltage for the application as a controlled gain video amplifier for use in conjunction with the above-described direct view storage tube may readily be in the form of a voltage having the same form as and synchronized with the deflection sweep voltage for the electron beam of the tube. By the present invention, then, it is possible to control the gain of the amplifier as a direct function of range such that the video signal applied to the writing gun of the direct view storage tube is decreased at short ranges where the sweep lines converge at the center of the scan.

It is an object, therefore, of the present invention to provide a voltage variable gain circuit which provides a form of ramp correcting voltage to modulate the input signal.

It is a further object of the present invention to provide a voltage variable gain circuit wherein the gain controlling gate or control voltage is completely cancelled from the output by the provision of an adjustable balance control.

Still a further object of the present invention is the provision of a voltage variable gain circuit utilizing direct-current coupling to ensure control gate cancellation accuracy.

These and other objects of the present invention will become more apparent upon reading the following description with reference to the accompanying drawings, in which.

Figure 1:
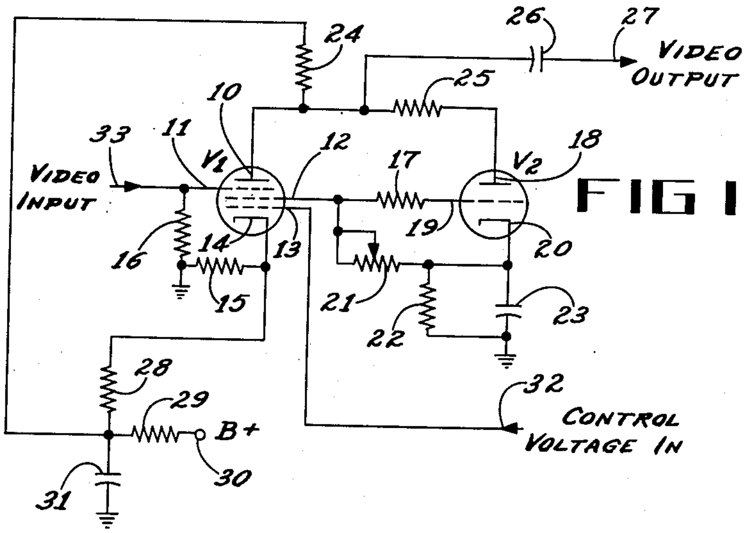
FIGURE 1 is a schematic illustration of the variable gain circuit.

With reference to FIGURE 1, the variable gain circuit of the present invention is seen to comprise first and second electron discharge devices V1 and V2. Video input signal is applied through input terminal 33 to suppressor grid 11 of tube V1. The plate 10 of tube V1 is returned through resistive load 24 and resistance 29 to a source of B+ potential 30. The plate 18 of tube V2 is likewise returned through resistive load 25, and resistors 24 and 29 to the B+ source 30. Video output is taken from the plate 10 of tube V1 through coupling capacitor 26 to output terminal 27. A source of control voltage is applied through terminal 32 to a control grid 13 of tube V1. Screen grid 12 of tube V1 is coupled through resistance 17 to the control grid 19 of tube V2. The screen grid 12 of tube V1 is additionally returned through variable resistance 21 to the cathode 20 of tube V2. The remaining elements in the circuitry of FIGURE 1 provide conventional bias arrangements and necessary signal bypassing for tubes V1 and V2.

The circuitry of FIGURE 1 operates as an amplifier stage with a controllable gain. Tube V1 is seen to be a pentode type tube and in an actual embodiment which was caused to be constructed tube V1 was chosen as a type 5725 or type 6AS6. These pentodes are of the type wherein the suppressor grid 11 has essentially the same transconductance to the screen grid 12 as to the plate 10 and wherein the control grid 13 has essentially the same magnitude and polarity of transconductance to the screen grid 12 and the plate 10. Thus, the suppressor grid 11 acts somewhat as a switching electrode between two identical plates (one plate actually being the screen grid 12). In operation, the transconductance of tube V1 is variable as a function of the control or gate voltage applied to control grid 13. The input to terminal 33 may be in the form of a negative-going video signal. The gain controlling gate voltage applied from terminal 32 to the grid 13 of tube V1 might then be in the form of a positive-going sawtooth waveform derived as a time-related function with respect to a deflection sweep voltage when considering the circuit to be operating in conjunction with a PPI display. The output signal from terminal 27 is in the form of the video input signal amplitude modulated in accordance with the control voltage applied to terminal 32. The circuitry operates such that the form of the control voltage input to terminal 32 is canceled and does not appear in the output from terminal 27, although the output amplitude is controlled as a direct function of the control voltage applied at terminal 32.

Figure 2:
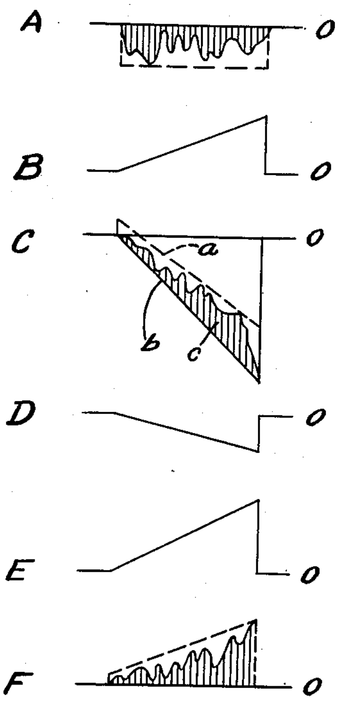
FIGURE 2 is a graphical representation of key waveforms within the circuit of FIGURE 1.

The operation of the circuitry of FIGURE 1 may be illustrated as follows with reference to the waveforms of FIGURE 2. A video input signal might be in the form of waveform A, consisting of a series of pulses varying in height and time of occurrence but always staying within the dotted rectangular envelope. The gain controlling input signal or control voltage to terminal 32 might be in the form of the positive-going sawtooth waveform B of FIGURE 2. It is to be understood that the particular control voltage herein illustrated would be derived as a function of a deflection sweep voltage should the circuit be utilized for a PPI presentation wherein the video signal is desired to be controlled intensity-wise as a direct function of range. This particular control voltage application and the particular vieo waveform of FIGURE 2 are by way of illustration of a particular application only and the invention is not to be so limited. It is to be realized that the particular control voltage input might be any desirable direct-current control voltage depending upon the particular type of gain characteristic desired.

As above described, the circuit of this invention operates to control the gain function in accordance with the control voltage input while cancelling the control voltage per se from the output waveform.

The sawtooth control voltage signal on the grid 13 of V1 changes the gain of stage V1 but would appear in the output of the stage if tube V2 were not incorporated. The control voltage as illustrated in waveform B of FIGURE 2 is applied to grid 13 of V1 and appears on grid 12 of tube V1 in opposite phase or sense. This signal is applied through resistance 17 to the grid 19 of tube V2 so that the plate current of tube V2 is 180° out-of-phase or of opposite sense or polarity with respect to the signal on the plate 10 of tube V1. Since the plate load of tube V2 is also the plate load for tube V1, the control voltage signal may be completely canceled from the output by proper adjustment of the balance control 21 which varies the amplitude of the signal on the grid 12 of tube V1 as applied to tube V2.

Accordingly, when the video signal A and the gain controlling waveform B are applied to the circuit, the situation is illustrated by waveform C. Waveform C illustrates a line "*b*" which would be the resulting output in the absence of the video signal of waveform A under conditions where the gain controlling waveform B is not canceled. Line "*b*" is seen to define an amplified and inverted form of waveform B. The dotted line "*a*" of waveform C corresponds to the positive edge of the output video envelope for the video signal *c* at the plate of V1, the video signal *c* being positive going because of the polarity reversal introduced by tube V1. The video signal *c* is seen to have an envelope amplitude ($a—b$) which increases with time as a function of waveform B. It is, thus, noted that the envelope of the video signal of waveform C experiences the desired increase in amplitude with time, but the base line is tilted as a function of the gain controlling waveform B. Means are, therefore, provided to take out this undesirable base-line tilt by cancellation of the control voltage characteristic per se with an inverted form of waveform B which is applied to the plate output circuit. Waveform D illustrates the signal applied to the grid 19 of tube V2 which is variable by the setting of resistor 21 and which is seen to be an inverted form of the input control voltage applied to grid 13 of tube V1. Waveform E of FIGURE 2 illustrates the amplified version of waveform D as it appears on the plate 18 of tube V2. Waveform F of FIGURE 2 shows the resulting composite output voltage, as applied through capacitor 26 to output terminal 27, in the form of a video enevlope which includes no base line tilt and increases with time as a function of waveform B. Waveform F is thus seen to be that of input video waveform A inverted with envelope determined by the form of the input control voltage as illustrated in waveform B.

It is thus seen that the present invention provides a voltage variable gain circuit whereby the gain of an input signal may be controlled as a function of an input control voltage and wherein the output signal may be made to be completely free of the control voltage characteristic per se. This arrangement results from the incorporation of means whereby the control voltage may be effectively balanced out of the output waveform.

Although this invention has been described with respect to a particular embodiment thereof, it is not to be so limited as changes might be made therein which are within the fully intended scope of the invention as defined in the appended claims.

I claim:

1. A voltage variable gain circuit for amplitude modulating a direct current input signal in accordance with a selected oppositely polarized direct current control signal, each of said input and control signals being referenced to a common reference potential; comprising first and second electron discharge devices, a common load element connected to output elements of each of said first and second electron discharge devices and to a supply voltage source, one terminal of which defines said reference potential, said control signal being applied to a first control element of said first electron discharge device, said input signal being applied to a second control element of said first electron discharge device, a first output taken from said first electron discharge device as a composite signal determined by said first and second input signals thereto and applied through said common load, a second output taken from a third control element of said first electron discharge device as an inverted form of said first input thereto and applied between said common reference and an input electrode of said second electron discharge device, the output of said second electron discharge device being additionally applied to said common load, and means for controlling the amplitude of the input to said second electron discharge device with respect to said common reference whereby the output from said second discharge device may be selected to realize a cancellation effect of the control signal characteristic appearing in said common load from the output supplied thereto from said first electron discharge device.

2. A voltage variable gain circuit for amplitude modulating a direct current input signal in accordance with a selected oppositely polarized direct current control signal, each of said input and control signals being referenced to a common point of reference potential; comprising first and second electron discharge devices, a common load element connected to output elements of each of said first and second electron discharge devices and to a supply voltage source, one terminal of which is connected to said reference point, said control signal being applied to a first control element of said first electron discharge device, said input signal being applied to a second control element of said first electron discharge device, a first output taken from said first electron discharge device as a composite signal determined by said first and second input signals thereto and applied through said common load, a second output taken from a third control element of said first electron discharge device as an inverted form of said first input thereto and applied as an input to said second electron discharge device, the output of said second electron discharge device being additionally applied to said common load, controlling means for adjusting the amplitude of the input to said second electron discharge device, the output from said second electron discharge device being selectively variable by said controlling means to realize a cancellation effect of the control signal characteristic appearing in said common load from the output supplied to said load from said first electron discharge device, said amplitude controlling means including a variable resistance coupling network connected between the third control element of said first electron discharge device and said common reference potential.

3. A voltage variable gain circuit comprising first and second electron discharge devices, said first electron discharge device including a plate, a cathode, and a plurality of grid elements, said second electron discharge device including at least a plate, a cathode, and a grid element, the plate elements of said first and second discharge devices connected through a common load to a source of B+ potential, a direct-current input signal of first polarity applied to a first grid of said first electron discharge device, a gain controlling direct-current voltage with polarity opposite that of said input signal applied to a second grid of said first electron discharge device, said input signal being amplitude modulated in accordance with said gain controlling voltage, means for coupling a signal like that of said gain controlling signal and reversed in phase with respect thereto from a third grid of said first electron discharge device to the grid of said second electron discharge device, said coupling means including means to establish the amplitude of the signal applied to said second discharge device in response to which a preselected cancellation of said gain controlling signal is realized in said common load.

4. A voltage variable gain circuit comprising first and second electron discharge devices, said first electron discharge device including a plate, a cathode, and a plurality of grid elements, said second electron discharge device including at least a plate, a cathode, and a grid element, the plate elements of said first and second discharge devices connected through a common load to a source of B+ potential, a direct-current input signal of first polarity applied to a first grid of said first electron discharge device, a gain controlling direct-current voltage with polarity opposite that of said input signal applied to a second grid of said first electron discharge device whereby said input signal may be amplitude modulated in accordance with said gain controlling voltage, means for coupling a signal like that of said gain controlling signal and reversed in phase with respect thereto from a third grid of said first electron discharge device to the grid of said second electron discharge device, said coupling means including a resistance network by which a preselected degree of coupling between said first and second electron discharge devices may be realized to selectively control the amplitude of the signal applied to said second electron discharge device in such a manner that cancellation effect of said gain controlling voltage is realized in said common load.

References Cited in the file of this patent

UNITED STATES PATENTS

| | | |
|---|---|---|
| 2,224,582 | Schnell | Dec. 10, 1940 |
| 2,413,348 | Hammond | Dec. 31, 1946 |
| 2,474,978 | Holland | July 5, 1949 |
| 2,496,909 | Eberhard | Feb. 7, 1950 |
| 2,640,103 | Clements | May 26, 1953 |
| 2,739,189 | Kock | Mar. 20, 1956 |